Fig. 1

Oct. 14, 1930. R. M. THOMPSON 1,778,342
FILTER DEVICE
Filed Jan. 3, 1921 7 Sheets-Sheet 2

INVENTOR
Robert M Thompson
BY
G Wright Arnold
ATTORNEY

Oct. 14, 1930.    R. M. THOMPSON    1,778,342
FILTER DEVICE
Filed Jan. 3, 1921    7 Sheets-Sheet 3

INVENTOR
Robert M Thompson
BY
Albright Arnold
ATTORNEY

Oct. 14, 1930.   R. M. THOMPSON   1,778,342
FILTER DEVICE
Filed Jan. 3, 1921   7 Sheets-Sheet 5

Inventor
Robert M. Thompson
Attorney
G. Wright Arnold

Patented Oct. 14, 1930

1,778,342

UNITED STATES PATENT OFFICE

ROBERT M. THOMPSON, OF TACOMA, WASHINGTON

FILTER DEVICE

Application filed January 3, 1921. Serial No. 434,662.

My invention relates to filter devices.

While my invention may be used in separating any and all fluids from other fluids or solids, however, herein I will describe my filter device as used in the separation of liquids from liquids and from solids in connection with the treating of fish and fish offal to separate the fish oils and the fish glue stock from the solid parts of the fish, and then the fish oils from the said fish glue stock.

Heretofore in the art in general four forms or types of filter presses have been used:

First, the hydraulic or knuckle joint type where squeezing pressure is applied externally to the material to be separated. This is necessarily a batch form and non-continuous. The "batch form" type requires the material that is to be separated to be placed in press cloths which are then folded about said material to form what is known as "cakes". These press cloths so folded are then placed one above the other with slat-drainage-separators therebetween. The press members are next caused to close together thereby applying pressure to the material in the cloths which causes the oils to pass through the press cloths and fall into a collecting reservoir.

Secondly, the filter press wherein the separating pressure is developed or applied through the separating material itself by means of a pump or the like so that part of the material is forced through a filter cloth. This is also a batch form and non-continuous in operation.

Thirdly, the screw press wherein the separating pressure is created by means of forcing the material into a continuously contracting chamber by means of a tapering screw or its equivalent so that the liquids are expressed through a filtering plate. This is continuous in operation but necessarily employs a perforated plate so that the filter liquids are not cleanly and clearly separated thereby necessitating further separating operations. Also, the plates being fixed in position, become clogged and the machine must be shut down to be cleaned.

Fourthly, the alternating vacuum and pressure filter, wherein the separating pressure is due to vacuum external of the material being filtered, said vacuum acting through a filter cloth. After a short period of operating, these cloths become clogged, whereupon the cloths must be cleaned, which is commonly done by subjecting the cloths to air pressure oppositely directed to that of the separating force. The separating pressure is limited to the degree of vacuum that can be maintained, which in many uses is far from being sufficient to separate the solids from the liquids. Thus, this type is intermittent or non-continuous in operation.

The general objections to these types of filter presses are that they operate too slowly and involve too much manual attention. The degree of pressure applied also is not subject to control and variation so that much of the desired filtrate may be left unexpressed and hence lost. Experience has taught that the most practical form and the one commonly used for expressing fish oil is the batch form, or hydraulic press,—cumbersome, disagreeable and expensive as this method is. In this form the lack of uniformity of pressure is manifest. Here the cloths are stacked, and it is evident that the lower cloths or cakes of the tier are not only subjected to the pressure exerted by the press members but also to that due to the weight of the cakes and slats above. Further objection obtains in that the press cloths about the cakes are used over and over again and must be cleaned each time before re-using for efficient filtering—all of which requires much labor. The objection relative to "too much manual attention" is of special significance in connection with the expressing of fish oils. Such processing is objectionable on account of the disagreeable odors and dirty work in general connected therewith. Obviously, processes involving much manual attention, as for example, the handling of the press cloths for filling and removal for washing, are not only objectionable because of greatly increasing the labor element of the manufacturing cost but it is objectionable because it is difficult to secure operators at all to do such disagreeable work. Further such presses are not adapted to use in treating all kinds of fish and fish refuse for their oils, only such as have a bony skeleton of true bone structure can be so handled. Such true bone skeleton assists by forming in and of itself a sieve-like structure to hold the solids, such as fish fiber and makes such solids function as a yielding supporting structure to assume part of the pressure between the racks, thereby relieving the press cloths of undue lateral pressure. Thus, this bone structure constrains the operating pressure chiefly to the solids from which the oils and liquids are to be expressed.

The objects of my invention are to provide a filter device which will overcome the objections above noted, and which will be continuous in its operation. Further objects of my invention are to provide such a filter device as indicated, wherein the filter chamber is closed and bounded at least on one side with a continuous moving filter cloth belt; to provide such a filter press as indicated wherein the filter cloth may be cleansed (that is washed, brushed and dried) and made ready for reuse without any, or with the minimum of manual attention from operators; to provide such a filter device as indicated wherein the mass to be filtered may be subjected to heat or a vibratory movement or both to facilitate the separating process; to provide such a filter device as indicated which has a discharge outlet for the free escape of such portion of the filtrate as may be separated by gravity or the vibratory movement without passing through the filter cloth; to provide such a filter device as indicated wherein the filter cloth is supported or reenforced at such points as may be necessary; to provide a filter device as indicated which has means whereby a partial vacuum may be continuously maintained back of the filter cloth, which vacuum may be utilized to facilitate the filter process; to provide such a filter device as indicated which has supporting members for the filter cloth so disposed to each other that they may be caused to function as a controllable discharge outlet; to provide a filter device which utilizes a filter cloth first with one side exposed to the pressure and then with the other side exposed to the pressure thereby providing for the automatic self cleaning of the filter cloth by the reversal of direction of the expressed liquid therethrough; to provide a filter device which has two belts provided with chamber-forming teeth which belts are caused to approach each other gradually to create a pressure by a gradually diminishing of the size of the chamber formed by the teeth and which belts are caused to travel for a portion of its path in intermeshing relation to impart a sustained pressure to the material confined in said chambers; and to provide a filter device which subjects the material first, to a partial expression of the liquid contents, secondly, the removal of such pressure to permit the introduction of a diluting medium and then thirdly, a second expression of the liquids.

Other primary objects of my invention are: to provide a filter device having packing strips which will render the pressure chamber filter-tight and which will comform to the form of the pressure chamber; to provide a filter device which may be continuous in its operation and which will retain the advantages of the batch hydraulic cake-press device and improve upon said device while eliminating the objectionable features of the same; to provide a filter device which recognizes and provides for a time element in the filter process; to provide a filter device which may make use of the solid portions of the mass to be resolved into its component parts as a means of transmitting the motion of one moving belt to that of another movable belt in the filter chamber; to provide a filter device which will permit of the applications of the greatest pressures to that part of the mass to be operated upon wherein the percentage of fluids to solids is the greatest and vice versa; to provide a filter device which will overcome the tendency of back-flow where a highly plastic mass is to be operated upon; to provide a filter device wherein the filtering process is expedited by the withdrawal of the filtrate at different stages of the filtering process; to provide a filtering device having adjustably yieldingly jaw-like members constituting a discharging valve; and to provide a filter device having a vertically disposed filter-tight converging wall chamber with one or more walls formed by an endless filter belt, whereby the force of gravity operates to express the more free liquids thereby providing a coating on the filter belt and means to rotate said endless filter belt so that the coating is gradually built into a cake, the weight of the superimposed plastic material cooperating with the converging walls to express the less free liquids.

The above mentioned general objects of my invention together with others inherent in the same are attained by the mechanism illustrated in the following drawings, the same being merely a preferred exemplary form of embodiment of my invention, throughout which drawings like reference numerals indicate like parts.

A filter chamber 29 is formed with a moving filter belt 30, said chamber being preferably formed of two such belts, and such belts are preferably endless to provide for continuous operation. These filter belts are supported throughout the length of said filter chamber by slat belts 31 bearing the individual slats 32 said belt being preferably endless. Each slat of this belt 31 has rollers 33 bearing on track 34 throughout the length of said filter chamber. These slat belts 31 are driven by sprocket wheels 35. Tightening adjustment in the form of take up bearings 36 for said belts 31 are provided in connection with sprocket wheels 37. Track 34 is supported on Z-bars 38 by adjustable bolts 39, Figs. 3 and 4, and these Z-bars are in turn supported by the channel irons 40 which form the end walls of the filter chamber. Cross beams 41 in the bottom are supported by the said upright channel irons 40 as are also cross beams 42 at the top. Said beams 41 carry the shafts 43 and 44 on which shafts are gears 45 and 46 respectively. Between said latter gears are gears 47 and 48 which transmit and reverse the driving force as respects gear 46. Gear 45 meshes with pinion 49 on shaft 50 which has gear 51, which in turn meshes with gear 52 integrally formed with pully 53, said gear 52 and pulley 53 being revolubly mounted on shaft 43. Said pulley 53 is preferably driven from a variable speed mechanism not shown herein of the conventional type, so that the speed of the filter belt 30 may be varied according to the rate of filter.

Figure 1:
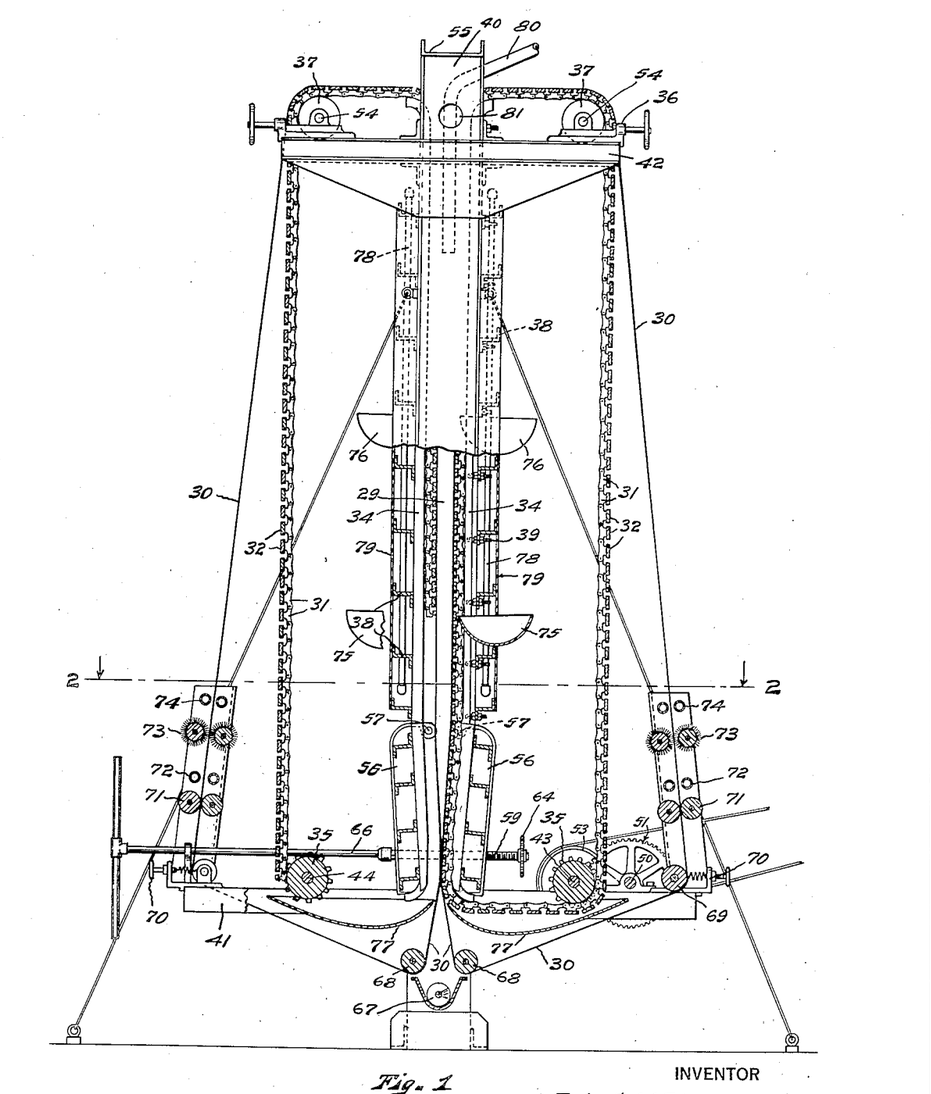
Fig. 1 is a view in vertical cross section of a device embodying my invention.
Figures 2, 7:
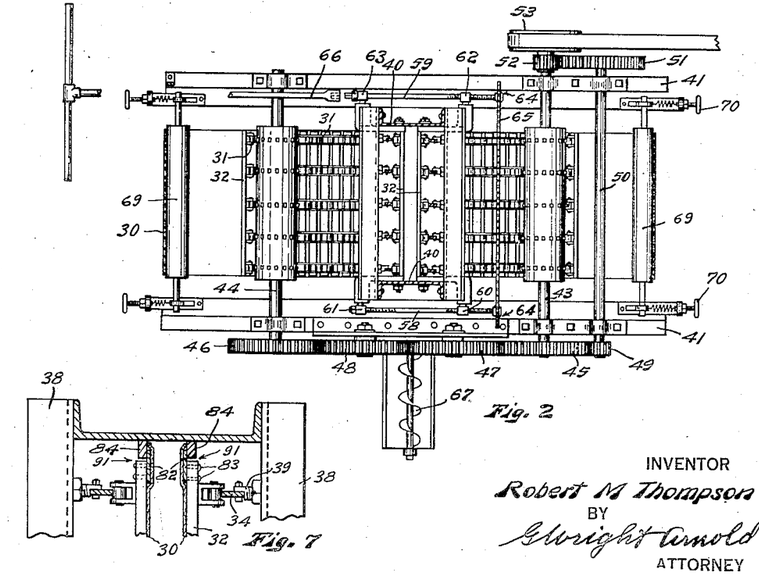
Fig. 2 is a view in cross section on broken line 2, 2 of Fig. 1.
Fig. 7 is a detailed view of the filter belts and modified form of the slats provided with extension plates and associated packing strips, in connection with their bearing on the end packing strips.
Figures 5, 6:
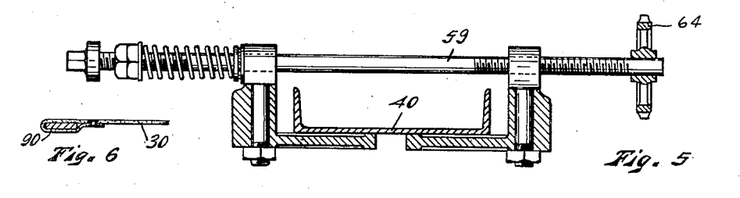
Fig. 5 is a detailed view of the pressure control mechanism of the discharge jaw-like members.
Fig. 6 is a detailed view of the construction of the edge of the filter belt.

Cross beams 42 at the top support the shafts 54 which carry the said idling sprockets 37 in connection with which the adjustable hand takeup bearings 36 serve as a means of adjusting the sprocket 37 so that the tightening of the slat belts 31 can be controlled. Cross beams 55 serve to connect and reinforce the end channel irons 40. The track way 34 is preferably jointed in its lower portion to form jaw-like members 56 hingedly supported at 57. These jaw-like members form a valve discharge. The opening between these jaws at their lower end is controlled by adjusting rods 58 and 59. Rod 58 operates through oppositely directed threads in nuts 60 and 61 respectively while rod 59 similarly operates through right and left hand threaded nuts 62 and 63. Sprocket wheels 64 and chain 65 serve to connect the operation of rods 58 with rod 59. Wrench 66 operates rods 58 and 59 and may be applied to either. A spring may be disposed on rod 59 as shown in Fig. 5 and, similarly, a spring may be disposed on rod 58, and thus provide means for yieldingly holding the jaws together so that in the case of an undue pressure they may permit of the opening of the jaws and permit of the relief of said excessive pressure without injury to the device and will tend to cause the jaws to assume their original adjusted opening. Screw discharge 67 serves to carry away the solid matters discharged by the jaws. The filter belt 30 after leaving the supporting slat belt 31 in the lower end of the jaws, passes to roller 68 and thence to rollers 69 which are controlled by adjustable hand takeup bearings 70 by means of which the tension of the belt may be adjusted. The belt then passes between compression rollers 71 to press out the liquid remaining in the belt; thence between perforated water pipes 72 which pipes are disposed to throw a stream of water upon the filter belt; thence between rotary brushes 73; thence between perforated hot air drying pipes 74 and thence to the top of the slat belt.

Troughs 75 and 76 are provided back of the filter belt 30 at such elevations as to catch and keep separate the clear and less clear oil filtrate and thus are provided means in these troughs for simultaneously drawing off the liquids at different stages of the filtering process and hence are provided means for keeping separate the said filtrates of different qualities. Trough 77 is located under the jaws to catch the oil that may drip from the slat belt after ceasing contact with the filter belt. The inner edge of this trough is caused to extend well up between the jaw members 56 and to press against the filter belt 30 to remove all liquid possible at this point and thereby reduce the amount to be squeezed out by the compression rollers 71. Heating pipe 78 located in housing 79 back of the filter belt 30 serves to warm the material being filtered, thereby permitting, in the case of oil, the more ready separation of the oil from the solid parts. Inlet pipe 80 serves to introduce the material to be filtered. Overflow port 81 serves to permit the escape of such portion of the oil as becomes freely separated, i. e. rises to the surface.

Figure 8:
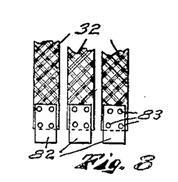
Fig. 8 is a top view of slats provided with plates.

To provide a tight, close, filter chamber, special provision is made in protecting the moving filter belt 30 in making contact with the stationary parts. On the ends of the slats 32, strip 82 of metal, leather or like abrasion-resisting material, are secured by bolts 83, Figs. 7 and 8. These strips 82 extend beyond the ends of the slats and bear upon the packing strip members 84. Thus the chief effect of the rubbing of the moving parts is assumed by the metal strips which also serve to bridge the gap between the ends of the slats and the said packing strip members 84. The filter belt 30 has its edges extending beyond the end of slats so that said edges may function as a packing and thereby reduce any leaking opening to a filtering size opening.

Figure 11:
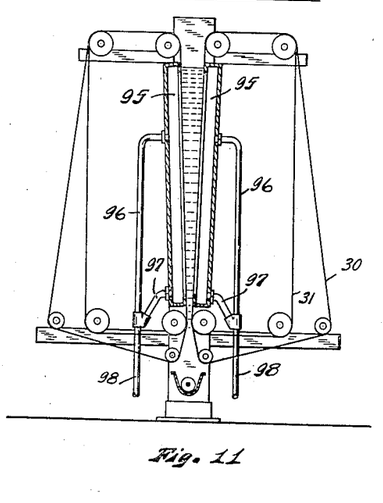
Fig. 11 is a modified form of a filter embodying my invention provided with a vacuum suction chamber back of the filter belt.
Figure 13:
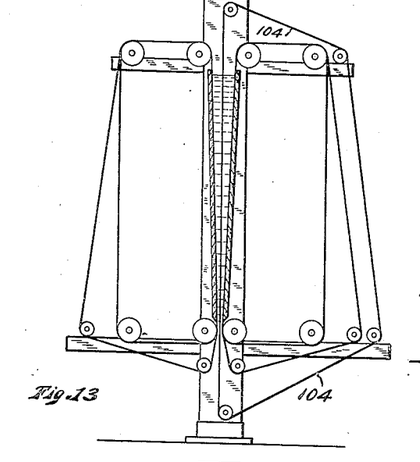
Fig. 13 is a modified form of a filter embodying my invention provided with a partitioning belt.

Be it particularly noted that the front face of the jaw members 56 (see Figs. 1, 2 and 5), that is, the faces next to the pressure chamber, form a movable packing strip and support for the filter cloth 30. In other words, I have a packing strip integral with the moving member so that its movement is controlled entirely by the movement of said members. Obviously, these jaw members may be extended the full length of the pressure chamber as is illustrated in Figs. 11 and 13. This would afford one illustration of having the packing strip integral and movable with the moving members, and thereby, the packing strip is caused to conform at all points to the form of the pressure chamber.

Figure 3:
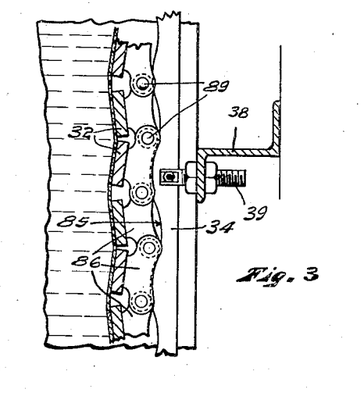
Fig. 3 is an enlarged detailed view of the slat belt and the supporting track.
Figure 4:
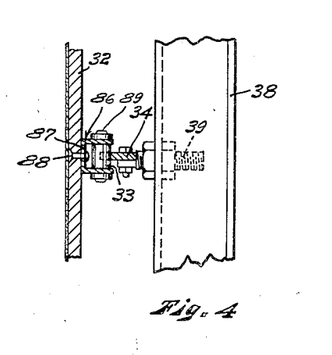
Fig. 4 is a detailed view of one of the rollers of the slat belt and the supporting track.

In Figs. 3 and 4 the track 34 is illustrated with a wave-like bearing surface 85 whereby is developed an undulatory movement in the belt as it travels, producing in addition to the constantly increasing pressure due to the converging of the belts, the periodic increasing and releasing of pressure upon the material. Thus is created a constantly varying pressure while the pressure exerted through the material itself is constantly increasing. The link 86 has its top plate 87 made fast to the slat 32 by bolt 88. Rollers 33 are mounted in said links 86 on pin 89. To assume the great pressure five of such links and rollers, disposed at intervals across the belt, are provided for each slat. The pin 89 on which said rollers bear also pivotally joins the said links.

To provide a tight, close, filter chamber, the filter belt is turned back, Fig. 6, to enclose a reinforcing endless band 90. This enables the belt to bridge the space 91 between the end of the slat 32 and the packing strip 84 (Fig. 7) and insures protection against the too rapid wearing of the moving filter belt on the said stationary packing strips.

Figure 9:
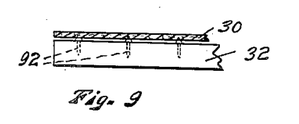
Fig. 9 is a view illustrating the use of calks to hold the belt.

Relative Fig. 9: On said slats 32 are inserted calks 92 adapted to retain the relative position of the filter belt and the slat. This insures the filter belt filling the full width of the filter chamber as well as forces the filter belt to travel with the supporting slat belt.

Figure 10:
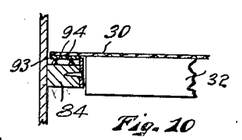
Fig. 10 is a detailed view of a modified form of a packing strip of the filter belt.

Relative Fig. 10: This illustrates still another modified form of overcoming the wearing of the filter belt by friction on the packing strip. In this form a moving belt 93 is caused to be moveably mounted on the packing strip 84 preferably provided with the knife edge support 94. Thus, the friction developed by the pressure between the filter belt and said belt 93 being greater than the friction between the belt 93 and the knife supports 94, causes the said belt to travel with the filter belt 30.

The modified form of filter shown in Fig. 11 has the vacuum chambers 95 provided in the rear of the filter chamber. The conduits 96 and 97, (each of the vacuum chambers having similar conduits), have the common outlet 98 which provides for the maintaining of the vacuum and the withdrawal of the expressed liquids at the same time.

Figure 12:
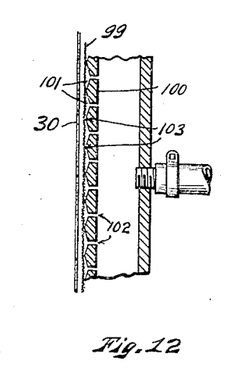
Fig. 12 is a detailed view of a modified form of filter belt support.

Another form of means to support the filter belt 30 is shown in Fig. 12 wherein said belt is supported on a wire cloth belt 99 instead of the said slat belt 31. This wire cloth belt 99 bears on plate 100 which has troughs 101, vertically disposed, perforations 102, and raised parts 103, to serve as bearing points for the wire cloth 99 whereby friction is reduced. For some uses the filter belt 30 might be dispensed with and the wire cloth belt 99 itself used as the filter fabric.

In Fig. 13 a modified form of my invention is shown wherein more than one kind of material may be filtered in the same device by providing an impervious moving belt 104 which operates as a partition to divide the filter chamber 21 into two parts, each one of which may be supplied with a different kind of material to be filtered. Where only one side of this device is to be operated, the belt 104 might be stopped and then we have the filter construction suggested in line 3, page 7, above.

Figure 14:
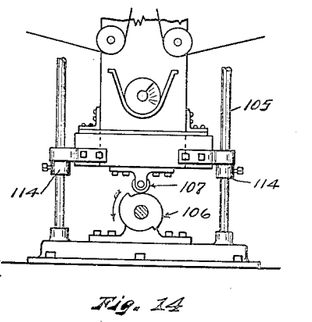
Fig. 14 is a view of the mechanism whereby vibration is imparted to the filter.

In Fig. 14 the mechanism for imparting a vibrating or water hammer effect to the material to be filtered is illustrated. The filter slideably mounted on guides 105 is caused to move up slowly by cam 106 bearing on roller 107 and then said cam permits the filter to fall and be suddenly stopped, whereby is developed the water hammer effect which builds up the expressing pressure and facilitates the travel of the solid parts through the machine.

Figures 15, 16, 17, 18, 19:
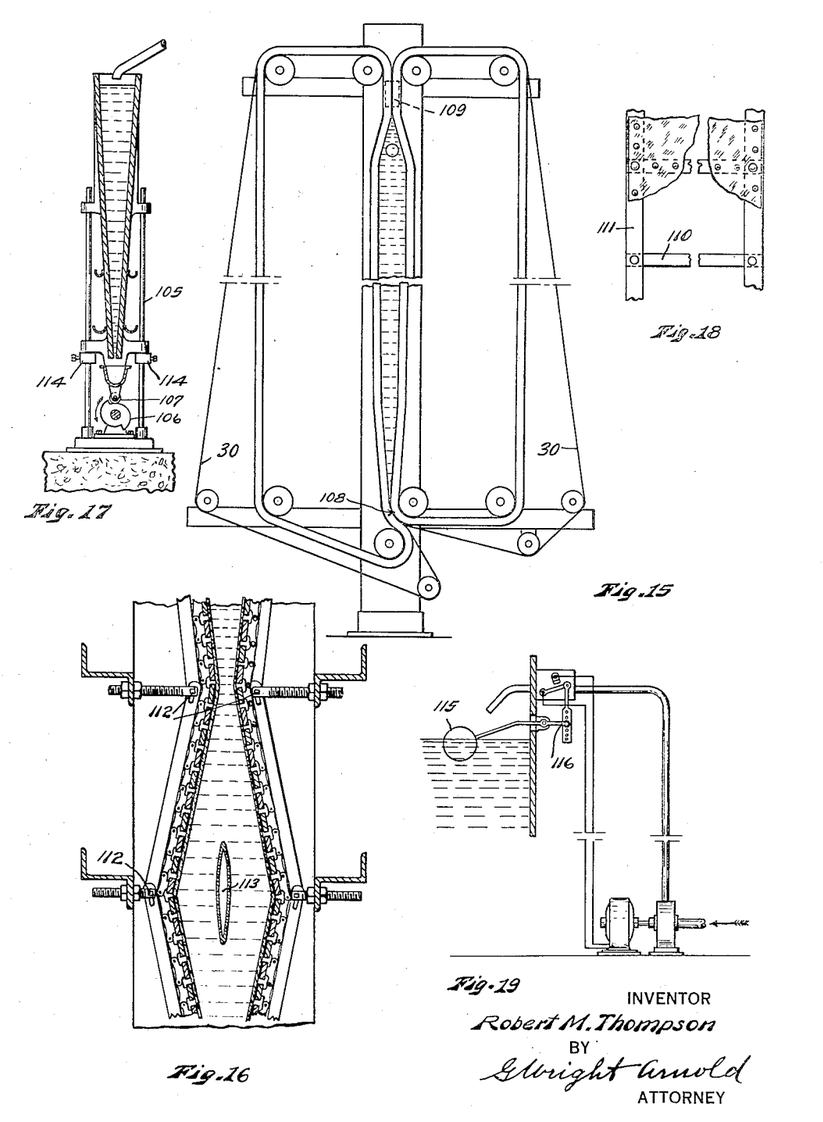
Fig. 15 is a view of a modified form of a filter press embodying my invention which is closed at the top and bottom, wherein the material to be filtered may be pumped in under pressure.
Fig. 16 is a view of a modified form of the track support showing a "broken" track whereby the material to be filtered may be subjected to pressure and this pressure removed for the purpose of diluting and then resubjected to pressure.
Fig. 17 is a view of a modified form of a filter embodying my invention wherein the water hammer force is used to bulid up pressure.
Fig. 18 is a view of the filter belt reinforcement.
Fig. 19 is a view in side elevation of an automatic control for the pump which supplies the material to be filtered to the filter chamber.

In Fig. 15 another modified form of filter embodying my invention is shown wherein the filter chamber is entirely and completely enclosed at the top and bottom and the expressing pressure is developed by pumping the material to be filtered into the chamber under pressure. To provide the closure at the top, the track way 34 is caused to extend in parallel and close relation at the upper part of the chamber in order that the filter belts may be caused to be pressed tightly together. At the bottom of the filter chamber one trackway on one side is caused to extend downwardly and under the other trackway so as to provide an extending contacting surface 108 between the two belts at this part of their travel. To maintain a tight chamber at the top between the moving filter belt 30 and the end walls 40 an adjustable packing box 109 is provided.

The providing of a closed filter chamber affords a filtering means of the true filter press form; that is, where the expressing pressure is supplied through the mass to be operated upon itself. This form of filter press provides for handling plastic materials, not only subject to the gravity head but to a still further pressure, namely that under which the fluids are pumped into the fluid pressures. This type of device would have the preference where the percentage of liquids to solids greatly predominate. This form illustrates a further advantage of having a vertical arrangement of the pressure chamber in that the particles of the solid matter tend of their own gravity to settle to the bottom where the converging belts are well adapted to operating upon them further for the expression of liquid content therefrom. Obviously the closing of the pressure chamber at the top may be further accomplished by supplying the adjustable jaw mechanism which is shown in Fig. 1 as members 56 with the yielding spring means as shown in Fig. 5. Also said closing of the chamber at the top might be accomplished thorugh means of the adjustable bolts.

Obviously, this modified form of filter belt might be reversed in its entirety, i. e., turned upside down, and the filter belts caused to run upwardly instead of downwardly. The mode of operation in this inverse order would be as follows: The gradually tapering end of the chamber would be upwardly disposed, and the more widely distended end of the chamber would be at the bottom, into which the materials would be pumped under pressure. Then as the belts move upwardly, the liquids would tend to be pressed out laterally through the filter belts, leaving the solid parts pressed against the inside of the filter belt, and, obviously, as these would be built up, they would tend to approach each other at the upper end and would tend to reinforce or hold each other against the filter belts and would be discharged upwardly. One advantage of such inverse disposition of this modified form would be that the widely distended portion of the chamber would be maintained in said widely distended form by reason of the weight of the material to be filtered. Also, the weight of the belts would manifestly tend to make them lie against the supporting medium.

Furthermore, be it noted that the modified form of filter shown in Fig. 15 has the novel features of functioning in the upper part of the filter chamber as a filter press wherein the more readily separable portion of the filtrate is separated due to the internal pressure, and then as the solid materials accumulate in larger portions toward the lower portion of the filter chamber, the two approaching walls develop an external pressure on the accumulated solids, thereby expressing the less readily separable liquids. Thus, we have in one form a combined filter press and press,—the filter press being distinguished from the press in that the pressure causing the separation is internally applied, whereas in the press it is externally applied.

In Fig. 16 the track is shown in broken form being pivoted, for example, at 112, thus permitting the changing of the form of the pressure chamber at such parts as desired and thereby change the amount of pressure. In this wise the filtering pressures, as well as the quantity of material being filtered at any one time, are subject to control. Also this permits of the releasing of the pressure at any point to provide for the injection of wash or diluting liquids through any suitable part 113, after which dilution, the materials can be resubjected to the pressure.

The liquids admitted to part 113 would be under pressure; therefore would not only operate to dilute any liquids remaining in the materials but would also operate to force out the same by replacement and thus operate in itself as an expressing medium.

In Fig. 17 a simple form of filter is illustrated wherein the expressing pressures are developed by means of the converging walls and vibratory means to develop the water hammer action. The water hammer action also causes the material to move through the machine. The position of the adjustable lugs 114 controls the pressures developed.

Obviously this vibration or water hammer effect is best adapted to a vertically disposed filter pressure chamber.

In Fig. 18 the metal slats 110 made fast upon the endless bands 111 constitute a frame to which the filter belt may be secured. The filter belt is well riveted at all points throughout the width of the belt to the slats 110. This prevents the distorting of the belt and prevents the belt from being drawn in on the sides. The side bands 111 also serve to span the gap 91 between the end of the slats 32 and the packing strip 84 as well as reduce wearing of the belt.

In Fig. 19 a means for automatically maintaining the level of the material in the filter chamber is illustrated wherein a float 115 is operatively disposed with respect to an electrical motor control 116 which motor pumps the material to be filtered.

Figures 20, 21:
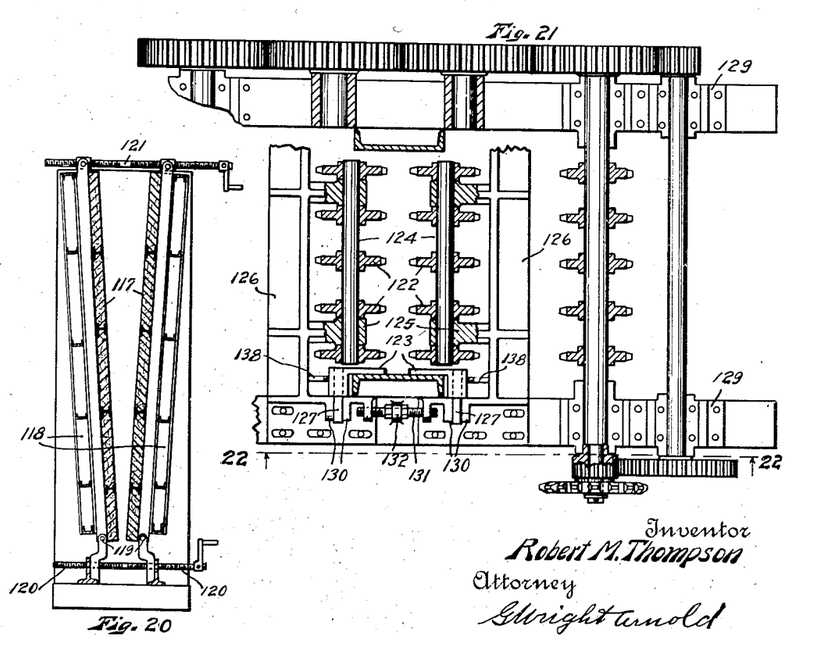
Fig. 20 is a view of a modified form of a filter embodying my invention wherein the opposing filter walls are hingedly mounted so that they can be lowered to the horizontal for cleaning purposes.
Fig. 21 is a plan view of a modified form of means for supporting the discharge portion of the slat belt.

In Fig. 20, a modified form of filter embodying my invention is shown wherein blocks 117 of porcelain replace the filter cloths and the supporting side walls 118 of said filter are pivotally mounted at 119, and adjustably disposed to each other by means of screws 120 and 121. By removing screw 121, the said walls may be lowered to the horizontal for purposes of cleaning or by operating the screws 120, the walls may be separated to such an extent that an operator can enter for purpose of repairing or the like.

Figure 22:
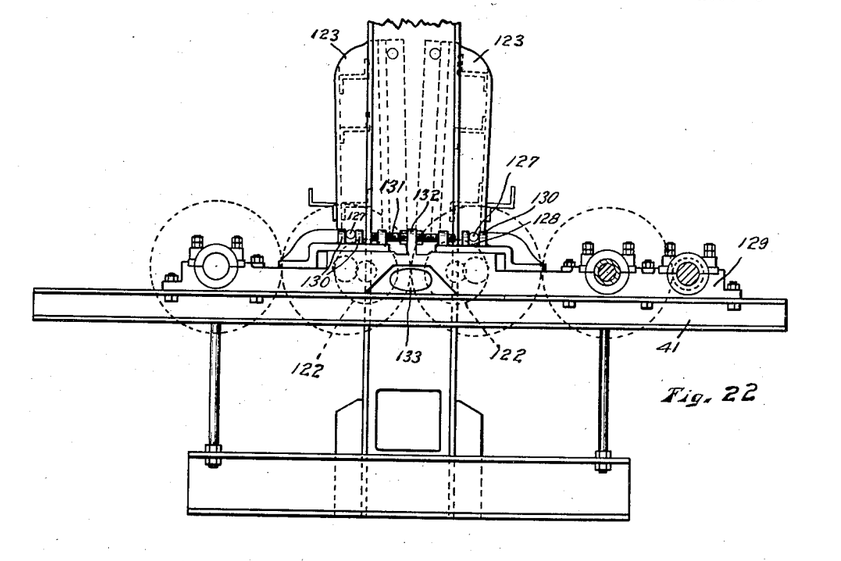
Fig. 22 is a view in section on broken line 22, 22 of Fig. 21.

In Figs. 21 and 22 a modified form of driving mechanism and discharge adjustment is provided, wherein sprockets 122 are mounted independent of the jaw-like member 123 except as they are movably connected as set forth below. The purpose of this construction is to eliminate the friction developed in drawing the slat belts over the jaw-like members as shown in Fig. 1 and particularly to provide a construction for the discharge portions of such strength that said portion can sustain the pressures developed. The sprockets 122 are mounted on shafts 124 which in turn are mounted on bearings 125 intermediate their lengths. These bearings 125 are rigidly connected to the frame 126. This frame 126 is slidably mounted by means of pin 127 in slots 128 on transverse member 129 which is rigidly attached to cross beam 41. The said frame 126 has lugs 130 between which the pin 127 of the jaw like members protrude so that as said frame 126 is moved transversely, the said jaws are likewise moved. The discharge opening between the jaws is not only definitely located but the degree of opening is controlled by the right and left hand threaded adjusting bolt 131 revolvably mounted in the lug 132. A glass covered opening 133 permits inspection of the discharging operation.

Figures 23, 24, 25, 26:
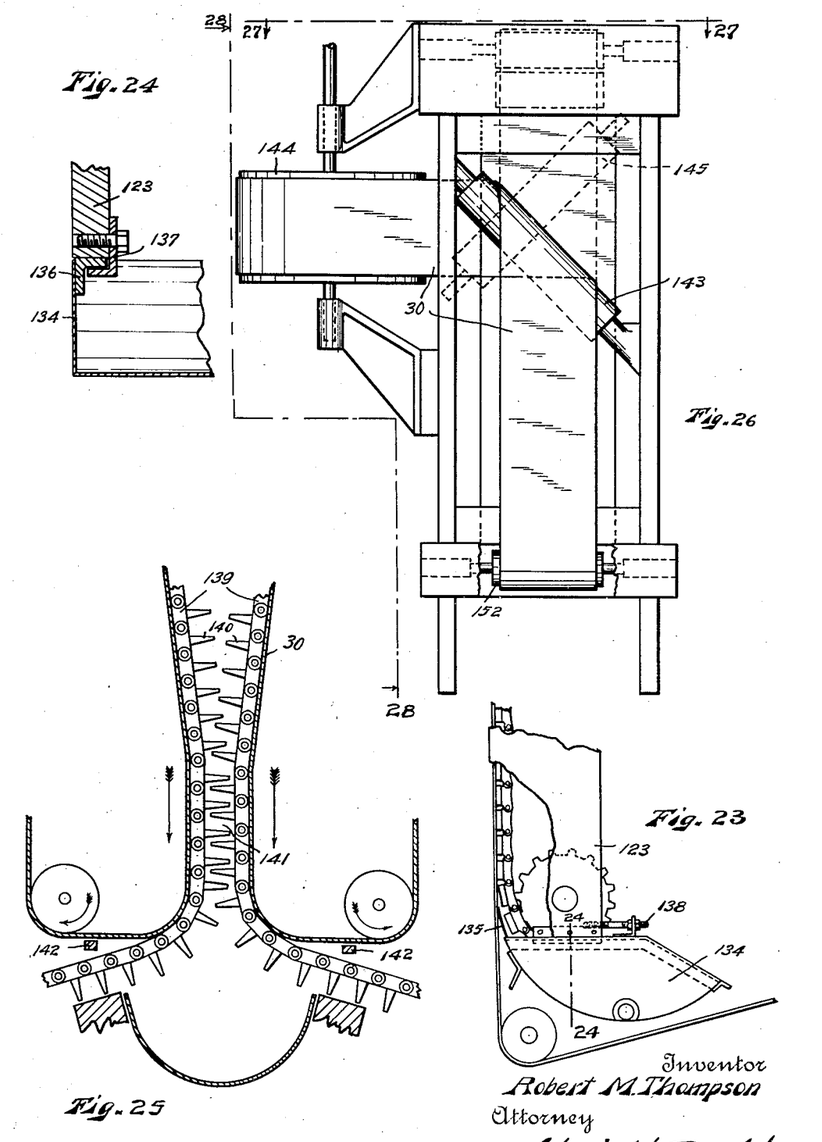
Fig. 23. is a detail view of trough adaption for adjustment with respect to filter belt and discharge support.
Fig. 24 is a detail view on broken line 24, 24, of Fig. 23.
Fig. 25 is a view of a modified form of chamber forming belts wherein the intermeshing parts are disposed to build up the necessary expressing pressure.
Fig. 26 is a side view in elevation of a filter embodying my invention provided with means for reversing the filter belt.

In Figs. 23 and 24 a modified form of discharge trough adjustably mounted with respect to the jaws and the filter belt is shown. A trough 134 having a flexible lip 135, said lip being disposed to bear against the filter belt 30, is slidably mounted by angle irons 136 and 137, said trough having the further adjusting support stud bolt 138 rigidly screwed into the jaw like member 123. Thus, the lip 135 can be maintained against the filter belt 30 regardless of the degree of the discharge opening. A small variance in the jaw opening will be taken up by the resiliency of the lip, while the large variance will be taken care of by the adjusting bolt 138.

In Fig. 25 a modified means of developing pressure upon the material to be filtered is provided, in the two endless chamber forming belts 139 which belts have intermeshing projections 140 to form compartments 141 in the lower part of the filter chamber. Back of these belts 139 is positioned the filter belt 30, either of wire cloth or canvas or other filter material, which filter belt travels with and under the said belt 139. The material is subjected to great pressure as the two belts approach each other and the projections form the said compartments. To free the said belts of solid parts, the vibrating hammer 142 is caused to strike upon each belt. This form is particularly adapted to materials which would tend to form a plastic cake of the solids so that said solids would tend to back up rather than travel through with the belts under increasing pressures.

Figure 27:
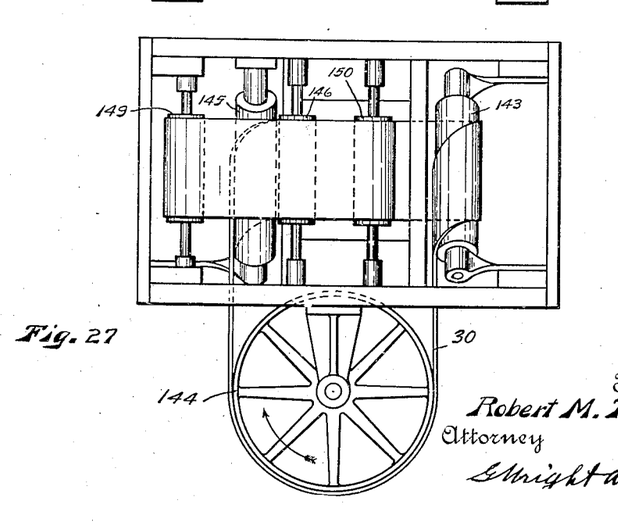
Fig. 27 is a view on broken line 27, 27 of Fig. 26.
Figure 28:
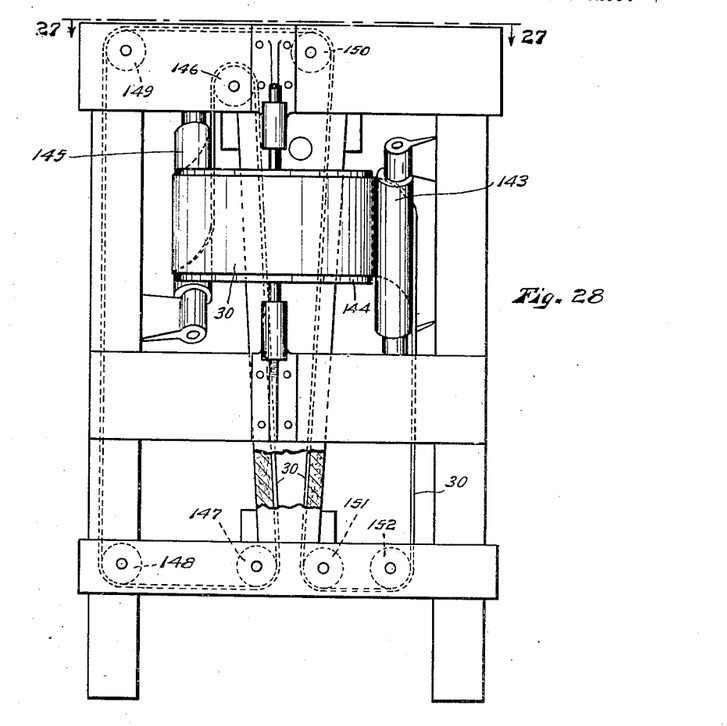
Fig. 28 is a view on broken line 28, 28 of Fig. 26.

The filter belt reversing mechanism is illustrated in Figs. 26, 27, and 28, wherein the filter belt 30 presents alternately a different side to the expressing pressure. The said filter belt is caused to pass over a roller 143 disposed at an angle of 45 degrees as shown; from this roller the said belt passes about drum 144 and from thence over roller 145 disposed at 45 degrees as shown; from said roller 145 said belt passes to roller 146 and thence down through the filter chamber and over roller 147; thence to roller 148; thence to roller 149; then to roller 150 and down through the filter chamber on the wall opposite to that on which it made its former descent; thence to roller 151, thence to roller 152; and thence to said roller 143, the place of beginning. In this case it is manifest that the belt is caused to present alternately upon descending through the filter chamber first one side and then the other, thereby affecting automatically the removal of sediment tending to clog the interstices of the filter belt.

The mode of operation of my filter is as follows: First, be it noted that whenever the term filter is used herein it is meant to relate to devices designed to separate liquids from solids. A filter cloth 30 is caused to form a moving confining wall for a filter chamber 29. In the preferred form two such walls are provided inclined toward each other whereby is formed a filter chamber 29 preferable of wedge-like shape,—said chamber being either entirely enclosed or open as the particular use may require when the chamber is entirely enclosed, that is, top, bottom and sides, the chamber is commonly referred to herein as "filter tight", that is, is tight to all parts of the material being treated excepting the fluids to be expressed or removed through that portion of the walls forming the said chamber which comprises the filter means. The purpose of the wedge form is to provide a gradually decreasing volume for the material to be filtered so as to provide for maintaining or increasing the pressure. The filter cloth after performing the filtering function is caused to travel out and away from the said filter chamber and from its reenforcing means—so that it may be cleaned, and thereby keep it at its maximum efficiency as a filtering medium and also to maintain cleanliness. This filter cloth is preferably in some uses caused to be supported by the reenforcing slats 32, arranged in the form of a belt 31. These slats may be grooved on the face adjacent the filter medium thereby providing the maximum drainage area. Each slat in turn for heavy pressures may have a roller 33 which travels upon the track 34. The lower portion of the supporting member for the filter cloth is preferably adjustably yieldingly disposed, thereby forming with the opposing member whether such member be a like member or a fixed member, a discharging or valve like outlet for the solid parts of the material filtered.

Steam pipes may be disposed back of the slats to maintain or increase the temperature of the mass being separated to facilitate the filtering process. Moreover, means to create a partial vacuum in the rear of said filter belt are provided so as to augment the pressure necessary for filtering to facilitate the separation process. In the form preferred for separating fish oils from fish offal, the wedge-shaped filter chamber in connection with the advance of the material through the filter imposes a pressure upon the mass being filtered which facilitates and augments the separation process. One of the chief means in creating the pressures in my device is the gradual approach of the belts toward one another while carrying the material through the machine. The expressing pressures and the movement of the material through the filter may be caused by the use of a vibratory motion, consisting of a very rapid motion in one direction which is stopped suddenly and a relatively slow return. This vibratory action developing a pressure commonly known as a water hammer may be combined with the converging belt method of developing pressure in treating materials where the same is found to be necessary either by reason of the need of great pressure or the difficulty of inducing the material to pass through the machine, such difficulty arising from the peculiar character of the material being treated. The character of some materials is such that sufficient expressing pressure may be developed and the operation more satisfactorily performed by means of providing a vacuum behind the filter medium. Still other materials may be better treated by applying the expressing pressure through the material itself by pumping or by a gravity head. Finally, all these methods of developing the expressing pressure and of handling the material may be combined in one form. Thus, one of the features of my invention is the great expressing pressure which may be developed and utilized. While the device embodying my invention operates by filter through a cloth as does the hydraulic, however, it is capable of operating with much greater pressures due to the fact that at no point is the filter chamber unreinforced whereas the hydraulic press utilizing filter cloths has under normal conditions a large portion of the expressing areas of the press cloths entirely unreinforced, so that the operating pressures positively can be no greater than the strength of the cloth.

Another important feature of my invention is the provision made for collecting separately different liquids expressed from the same material. For example in treating fish by-products under certain conditions the oil filters off before the glue-stock. A portion is freed by gravity so that it rises to the surface and can be drained off and the separation made without passing through the filter medium. The oils are first expressed and by providing troughs or other collecting means, such oils may be simultaneously drained away and kept apart from the glue-stock which is expressed at a lower level in the machine. In this wise, a rough separation is obtained as between the liquids coming from the same materials, and their refinement thereby greatly facilitated.

In the case of all materials it is important that the free liquids be removed at as early a stage as possible. My device achieves this result by providing a filter-tight portion in the upper part of the filter chamber and means by which the more free liquids may escape and at the same time deposit a coating of the more solid parts upon the filter belt. This coating gradually increases as the belt moves downwardly, the weight of the superimposed material functioning in cooperating with the converging side walls, to apply pressure to the less and less plastic portions of the material in its downward progress. Let it be noted that the coating is just as important a part of the filter medium as the belt itself and that the weight of the superimposed material is fundamentally essential to hold said less plastic material down so that the converging wall pressure may exert its expressing effort. Again, it is obvious, that it is a primary requisite to utilize the superimposed weight of the material to be filtered to resist any tendency of the gradually formed cake to move upwardly by reason of the squeezing effect of the converging walls. Thus, the gradually forming cake is carried into the portions of the device where the expressing pressure is very great. Again, let it be noted, that the cake herein referred to is only a relative term. That which constitutes a cake in the upper portion where the more free liquids are expressed is a cake where practically only gravity is operating and the cake has no tendency to rise against gravity but as the more free liquids are removed and the expressing pressures are developed by reason of the converging walls becoming effective, there is a tendency for the cake to rise in the filter chamber which is then opposed by the weight of the superimposed liquids.

From the above it is further evident that a fundamental requisite in any such mode of operation as above described is the time element. It is clear that the cake is not made quickly at any one point but is gradually developed from the gradually descending filter belts, said filter cake constituting at once both the filtering medium and the medium from which liquids are to be expressed. As density is developed in the cake the interstices becomes finer and it becomes more and more difficult for the liquids to escape through and from the gradually contracting interstices and due to the converging shape of the filter chamber and the less and less liquid content of the cake, there is less liquid to escape.

Another important feature of my invention is the fact that the entire operation is open to observation and as the degree of pressure at any point is controllable due to the providing of means external to the chamber for altering its form, a more economical and efficient filtering of the material can be performed.

Another feature of my invention is that of permitting the removal of the pressure after the separation or filtering process has advanced to a certain point and the solids resaturated with a diluting solution and then repressed which makes possible the saving of a larger percentage of the valuable liquids. This saturation and repressing is accomplished without interrupting or interfering with the original filtering operation,—in fact the whole process is one and continuous without a separate handling of the solids. Furthermore, this is done in a manner which permits the separate collecting of the liquids.

Another feature of my machine is that there are no internal operating members peculiarly subject to needing repairs and cleaning—all such parts being disposed externally and therefore readily accessible. The cleaning operation of my device necessitates no tearing down or dismantling.

Another feature of my invention is that the degree of friction pressure, or clearance between the plates, attached to the slats and extending over the packing strip, and the packing strip can be regulated by adjusting bolts 39 shown in Fig. 4.

The said adjusting bolts 39 also serve to permit of the changing of the pressures developed by the converging belts at any portion of the filter chamber. In short, one factor which determines the pressure at any given portion of the filter pressure chamber is the shape of the chamber at that point. These adjusting bolts 39 are means which control the form of said chamber or the degree of convergence.

It is obvious that the providing of a moving belt 31, formed of spaced slats, affords a means of gripping the solid portions of the mass being operated upon to transmit the movement of one belt to the belt oppositely disposed. This results from the fact that by providing spaces between the slats permits the great pressures developed to force the filter fabric 30 to arch between adjacent slats so that the solid parts tend to move with the belt and this constitutes obviously a direct means of transmitting the travel movement of one belt to the belt oppositely disposed, which belt is similarly constructed. In short, in the case of certain materials in a device embodying my invention, it is possible with the power applied to one belt only, to operate the other belt thereby eliminating many gears and other parts incident to applying power to both belts.

In filtering and expressing it is most important that greatest pressures should be applied to the said mass where the percentage of solids to liquids is the greatest, and the pressures between these extremes should vary inversely as the percentage of liquids to solids varies. Herein lies a fundamental reason for the vertically disposed pressure chamber in my invention.

Other reasons for the vertically disposed chamber are as follows: Where the mass to be operated upon is very plastic, that is, where the percentage of liquids to solids is great, a great difficulty obtains in confining the mass in order to retain the solids. Obviously, as soon as pressure is applied at one point, the plastic mass will try to escape uniformly at every other point of the confining chamber. Hence, in a filter chamber wherein pressures are developed by the travel of converging belts, a back-pressure or backflow is created, and unless some counteracting means or pressure is provided, said back-pressure, or flow, simply operates as a self-induced cause which effectually prevents the application of pressure to the solids; that is, the pressure developed by the converging belts is rendered very ineffective because the solid parts are permitted to escape from that portion of the chamber where effective pressures could be applied to express the liquid content. That is, in short the mass to be operated upon, due to its plasticity, will tend to back up rather than travel with the converging belts.

Manifestly the pressure developed by a column of plastic mass is dependent upon the head of said plastic mass and herein again is an important reason for vertically disposing the pressure chamber in my invention. Therefore, it is evident that independent of any converging of the belts the gravity head alone will provide efficient expressing pressures by reason of the fact that the lightest pressures obtain where the greatest fluidity occurs; namely, at the top of the pressure chamber and the pressures gradually increase as the depth increases and corresponding to the increase in depth there is the decrease in percentage of liquid. The traveling of the mass downward in the chamber to the lower depths has allowed for the time element during which there has been continuously a withdrawal or escaping of liquid through the filter means and its withdrawal in channels provided for said purpose. Let it be noted that this time element is fundamentally essential in every expressing operation and it is a fundamental object in my invention to provide cooperating means and factors which will coordinate with this time element. Again, a fundamental reason for vertically disposing the filter chamber in my invention is that the filter cloth will be cleanest at that portion of the filter chamber where the mass to be operated upon has the greatest percentage of liquids to solids and hence, the rate of separation at this point is greatly facilitated. Associated with this reason is that the vertical construction permits of an equal drainage or withdrawal of the liquid through the various filter means; whereas, in the horizontally disposed filter chamber the upper filter belt provides for a relatively poor drainage medium for the mass.

Another advantage for vertically disposing the pressure chamber in connection with converging belts lies in the fact that the pressures to which the material will be subject may be controlled. The importance of this is manifest when it is recognized that many materials have a practical limit to which the bulk may be reduced at that portion of the filter chamber where they are about to be discharged. Hence, by providing a vertically disposed filter chamber, the level to which the material may be supplied to said filter device may be regulated for each particular kind of material or change in the character of the same material; that is, for illustration,—if the width of the filter chamber at the top is six inches and the discharge opening is one inch, it is evident that said materials could not be compressed to permit of their discharge; in which case, the top level for such material in the pressure chamber might be maintained at the point where the converging belts are only three inches apart, if such three to one compression would be permissible for that given material. Moreover, a great saving in floor space arises by reason of the vertically disposed pressure chamber and this, together with facilitating the proper cleaning of the filter press, together with many other manifest advantages, render the vertically disposed chamber very preferable.

Against all of these advantages of the vertically disposed pressure chamber has been what heretofore has seemed to be the almost insurmountable difficulty of providing a filter having an expressing pressure chamber for very plastic masses.

Manifestly, the device embodying my invention, as herein set forth, is evolved from the batch hydraulic cake-press device made continuous, retaining the advantages of the said device and eliminating its disadvantages. That is, the device herein set forth retains the feature of said batch hydraulic cake-press device of draining through a filter fabric and retains the feature of having this fabric reinforced by a backing. Also the feature of applying the pressure gradually and retaining the all important feature of providing the time element. That is, sufficient time is allowed under a gradually increasing pressure to permit the filtrate to pass through the interstices of the gradually compressed solid matter. It being well understood that time is positively essential to provide for the escape of the filtrate. Also be it noted that the device herein provided affords means for controlling the pressure which is an advantage entirely lacking in the batch hydraulic press. Another advantage of the device herein provided over the batch hydraulic cake-press device is that there is applied the greatest pressure to that portion of the mass which has the least percentage of liquids while a gradually diminishing pressure applies to that portion of the mass which has the greatest percentage of liquids. In short, the pressure is made to conform to the percentage of liquids present in the mass. This feature is entirely lacking in the old single batch form of device in that the weight of the cakes at the bottom of the press are under the pressure of the weight of all those superimposed. Finally the device herein provided has the very great advantage which particularly characterizes it, namely, that of being continuous in its operation. The disadvantages herein above set forth are manifestly eliminated in the device embodying my invention.

It was from my general experience that the hydraulic press would handle materials that could not be handled as satisfactorily by any other type of filter means that caused me to develop the invention herein set forth along the general principles of the batch hydraulic cake-press. And particularly knowing that there were certain grades of material such as dogfish that could not be handled in any continuous press and in fact could be only handled satisfactorily by the batch hydraulic machine that compelled me to recognize that any continuous process machine must have the proven features inherent in the said batch hydraulic cake device.

Obviously, changes may be made in the forms, dimensions, and arrangement of the parts of my invention, without departing from the principle thereof, the above setting forth only a preferred form of embodiment.

While the vertical disposition of the device embodying my invention is the logical and best position as more fully set forth herein above, nevertheless, many of the advantages of the device embodying my invention may be obtained although the device is disposed horizontally.

I claim:—

1. A filter device embodying a filter tight filter chamber, closed top, bottom and sides, filter belts forming movable walls of said chamber, means to cause said filter belts to rotate, and means to introduce under pressure materials to be filtered.

2. In combination with the filter device having a moving filter belt and a movable reinforcing means, a supporting track having a curved wave-like bearing surface.

3. In a device of the character described the combination of a filter chamber, said chamber being of a form which is contracted and expanded at different points intermediate its length, and inlet means whereby a diluting liquid may be introduced into said expanded portion after partial expression of the materials being separated.

4. A filter device embodying a filter tight filter chamber closed top, bottom and sides, a filter belt forming one wall of said chamber, means to cause said filter belt to travel, means for the forcible feeding into said chamber continuously of material to be treated, and means for supplying and maintaining said chamber completely filled with said material whereby pressure may be developed in and through said material.

5. A filter device embodying a filter tight filter chamber closed top, bottom and sides, converging filter belts forming movable walls of said chamber, means to cause said filter belts to travel, means to introduce under pressure materials into said chamber to be filtered, and a discharge means at the converging end of said belts whereby the solid portions of said material treated may be removed from said chamber.

In witness whereof, I hereunto subscribe my name this 7th day of December, A. D. 1920.

ROBERT M. THOMPSON.